US009592451B2

(12) United States Patent
Hamilton, II et al.

(10) Patent No.: US 9,592,451 B2
(45) Date of Patent: *Mar. 14, 2017

(54) DIRECTED COMMUNICATION IN A VIRTUAL ENVIRONMENT

(71) Applicant: International Business Machines Corporation, Armonk, NY (US)

(72) Inventors: Rick A. Hamilton, II, Charlottesville, VA (US); John P. Karidis, Ossining, NY (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/471,394

(22) Filed: Aug. 28, 2014

(65) Prior Publication Data

US 2014/0368543 A1 Dec. 18, 2014

Related U.S. Application Data

(63) Continuation of application No. 12/113,250, filed on May 1, 2008, now Pat. No. 8,875,026.

(51) Int. Cl.
*A63F 13/87* (2014.01)
*A63F 13/54* (2014.01)
(Continued)

(52) U.S. Cl.
CPC .............. *A63F 13/87* (2014.09); *A63F 13/54* (2014.09); *G06F 3/012* (2013.01);
(Continued)

(58) Field of Classification Search
CPC ...... G06F 3/011; G06F 3/012; A63F 2300/65; G06T 13/40; G02B 2027/0187; G06K 9/00248
See application file for complete search history.

(56) References Cited

U.S. PATENT DOCUMENTS 5,736,982 A * 4/1998 Suzuki .................... G06T 15/30
348/E7.083
6,028,603 A 2/2000 Wang et al.
(Continued)

FOREIGN PATENT DOCUMENTS

JP 6-28603 Y2 8/1994
KR 20020087602 A 11/2002

OTHER PUBLICATIONS

Bing Searches: q=avatar+direction+pitch+gender+acce; and q=avatar+direction+voice+pitch+gender; and q=avatar+facing+pitch+gender+accent; and q=avatar+orientation+pitch+gender+acces, Jun. 14, 2014, 6 pages.
(Continued)

*Primary Examiner* — Jeffrey A Gaffin
*Assistant Examiner* — John M Heffington
(74) *Attorney, Agent, or Firm* — Lisa Ulrich; Hoffman Warnick LLC

(57) ABSTRACT

The present invention relates to directed communication between avatars in a virtual environment controlled by end-users from outside the virtual environment. A method in accordance with an embodiment includes: determining a relative location of a first avatar and a second avatar in a virtual environment, wherein at least one end-user of the first avatar and the second avatar wears a headset configured to track head movements thereof, wherein the head movements of the end-user translate to their avatar and influence volume of voice communication from their avatar; adjusting aspects of a voice communication between the first avatar and the
(Continued)

second avatar based on the relative location and the track head movements; referring to a list of avatars whose audio characteristics are to be portrayed differently in a voice communication; and further adjusting the audio characteristics of one of the first avatar and the second avatar in accordance with the list.

20 Claims, 5 Drawing Sheets

(51) Int. Cl.
*G06F 3/0484* (2013.01)
*G06T 19/00* (2011.01)
*G10L 17/22* (2013.01)
*H04L 12/58* (2006.01)
*G06F 3/01* (2006.01)
*G06T 13/40* (2011.01)
*G02B 27/01* (2006.01)
*G06K 9/00* (2006.01)
*H04L 29/06* (2006.01)

(52) U.S. Cl.
CPC ........ *G06F 3/04847* (2013.01); *G06T 19/006* (2013.01); *G10L 17/22* (2013.01); *A63F 2300/308* (2013.01); *A63F 2300/5553* (2013.01); *A63F 2300/572* (2013.01); *A63F 2300/6081* (2013.01); *A63F 2300/65* (2013.01); *G02B 2027/0187* (2013.01); *G06F 3/011* (2013.01); *G06K 9/00248* (2013.01); *G06T 13/40* (2013.01); *G06T 2200/04* (2013.01); *G06T 2215/16* (2013.01); *G06T 2219/024* (2013.01); *G06T 2219/2004* (2013.01); *H04L 12/581* (2013.01); *H04L 12/582* (2013.01); *H04L 51/00* (2013.01); *H04L 67/38* (2013.01)

(56) References Cited

U.S. PATENT DOCUMENTS

| | | | |
|---|---|---|---|
| 6,154,211 A * | 11/2000 | Kamachi | G06T 15/20 345/419 |
| 6,229,533 B1 | 5/2001 | Farmer et al. | |
| 6,246,411 B1 | 6/2001 | Strauss | |
| 6,396,509 B1 | 5/2002 | Cheng | |
| 6,476,830 B1 | 11/2002 | Farmer et al. | |
| 6,822,663 B2 | 11/2004 | Wang et al. | |
| 7,006,616 B1 | 2/2006 | Christofferson et al. | |
| 7,086,005 B1 | 8/2006 | Matsuda | |
| 7,177,045 B2 | 2/2007 | Goel et al. | |
| 7,181,690 B1 | 2/2007 | Leahy et al. | |
| D556,774 S | 12/2007 | Migirova et al. | |
| D563,982 S | 3/2008 | Montagne et al. | |
| 7,342,587 B2 | 3/2008 | Danzig et al. | |
| 7,346,654 B1 * | 3/2008 | Weiss | H04N 7/15 348/E7.083 |
| 7,447,996 B1 | 11/2008 | Cox et al. | |
| 7,707,520 B2 | 4/2010 | Ashtekar et al. | |
| 7,865,566 B2 | 1/2011 | Ashtekar et al. | |
| 7,908,554 B1 | 3/2011 | Blattner | |
| 7,912,793 B1 | 3/2011 | Danzig et al. | |
| 7,913,176 B1 | 3/2011 | Blattner et al. | |
| 7,945,856 B2 | 5/2011 | Leahy et al. | |
| 7,966,567 B2 | 6/2011 | Abhyanker | |
| 7,995,064 B2 | 8/2011 | Guymon, III et al. | |
| 7,995,090 B2 | 8/2011 | Liu et al. | |
| 8,051,462 B2 | 11/2011 | Hamilton, II et al. | |
| 8,250,144 B2 | 8/2012 | Blattner et al. | |
| 8,261,307 B1 | 9/2012 | Islam et al. | |
| 8,290,881 B2 | 10/2012 | Danzig et al. | |
| 8,291,218 B2 | 10/2012 | Garcia et al. | |
| 8,402,378 B2 | 3/2013 | Blattner et al. | |
| 8,403,751 B2 | 3/2013 | Boustead et al. | |
| 8,421,805 B2 | 4/2013 | Bishop | |
| 8,510,678 B2 | 8/2013 | Kim | |
| 8,612,750 B2 | 12/2013 | Garcia et al. | |
| 8,620,850 B2 | 12/2013 | Brown et al. | |
| 8,627,215 B2 | 1/2014 | Blattner et al. | |
| 8,650,134 B2 | 2/2014 | Danzig et al. | |
| 2001/0044725 A1 | 11/2001 | Matsuda et al. | |
| 2002/0024675 A1 * | 2/2002 | Foxlin | G02B 27/017 356/620 |
| 2002/0087602 A1 | 7/2002 | Masuda et al. | |
| 2002/0118195 A1 * | 8/2002 | Paetzold | G06K 9/00228 345/473 |
| 2003/0020956 A1 | 1/2003 | Goel et al. | |
| 2003/0234859 A1 * | 12/2003 | Malzbender | A63F 13/12 348/14.05 |
| 2004/0075677 A1 | 4/2004 | Loyall et al. | |
| 2004/0085334 A1 | 5/2004 | Reaney | |
| 2004/0130568 A1 | 7/2004 | Nagano et al. | |
| 2004/0179037 A1 * | 9/2004 | Blattner | G06T 13/40 715/751 |
| 2004/0179039 A1 | 9/2004 | Blattner et al. | |
| 2004/0221224 A1 | 11/2004 | Blattner et al. | |
| 2006/0025216 A1 | 2/2006 | Smith | |
| 2006/0067500 A1 | 3/2006 | Christofferson et al. | |
| 2006/0093998 A1 * | 5/2006 | Vertegaal | G06F 3/011 434/236 |
| 2006/0184886 A1 | 8/2006 | Chung et al. | |
| 2006/0268315 A1 | 11/2006 | Randt | |
| 2007/0044028 A1 | 2/2007 | Dunn et al. | |
| 2007/0074114 A1 | 3/2007 | Adjali et al. | |
| 2007/0130276 A1 | 6/2007 | Zhang et al. | |
| 2007/0168359 A1 * | 7/2007 | Jacob | A63F 13/12 |
| 2007/0168863 A1 | 7/2007 | Blattner et al. | |
| 2007/0234223 A1 | 10/2007 | Leavitt et al. | |
| 2007/0248220 A1 | 10/2007 | Crandell et al. | |
| 2007/0260984 A1 | 11/2007 | Marks et al. | |
| 2008/0098064 A1 | 4/2008 | Sherinian | |
| 2008/0178633 A1 | 7/2008 | Jeong et al. | |
| 2008/0209309 A1 | 8/2008 | Zhang et al. | |
| 2008/0215974 A1 | 9/2008 | Harrison et al. | |
| 2009/0043846 A1 | 2/2009 | Inoue | |
| 2009/0044113 A1 * | 2/2009 | Jones | G06T 13/40 715/707 |
| 2009/0164549 A1 * | 6/2009 | Jung | G06Q 30/02 709/201 |
| 2009/0248816 A1 | 10/2009 | Appelman et al. | |
| 2010/0049346 A1 | 2/2010 | Boustead et al. | |
| 2010/0169801 A1 | 7/2010 | Blattner et al. | |
| 2011/0029898 A1 | 2/2011 | Malik | |
| 2011/0072351 A1 | 3/2011 | Shintani et al. | |
| 2011/0191413 A1 | 8/2011 | Leahy et al. | |
| 2011/0225549 A1 | 9/2011 | Kim | |
| 2012/0019560 A1 | 1/2012 | Inoue | |

OTHER PUBLICATIONS

Heffington, Office Action Communication for U.S. Appl. No. 12/113,250 dated Sep. 21, 2011, 21 pages.
Heffington, Notice of Allowance and Fee(s) Due for U.S. Appl. No. 12/113,250 dated Jun. 24, 2014, 18 pages.
Heffington, Office Action Communication for U.S. Appl. No. 12/113,250 dated Apr. 1, 2011, 19 pages.
Heffington, Office Action Communication for U.S. Appl. No. 12/113,250 dated Mar. 3, 2014, 25 pages.

* cited by examiner

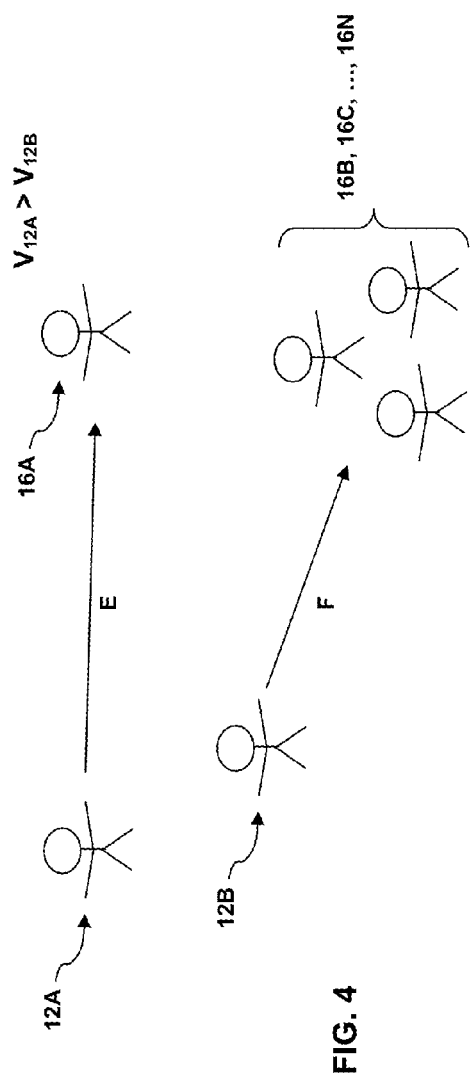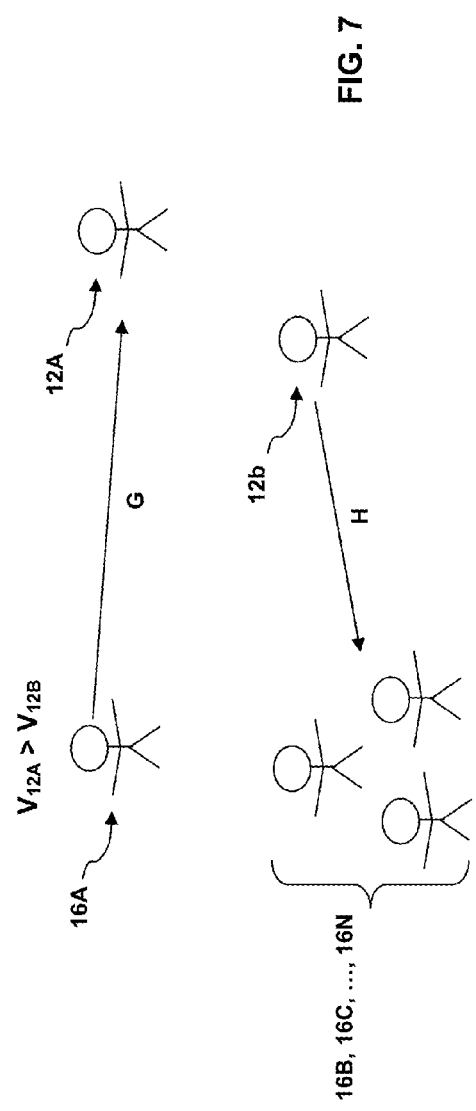

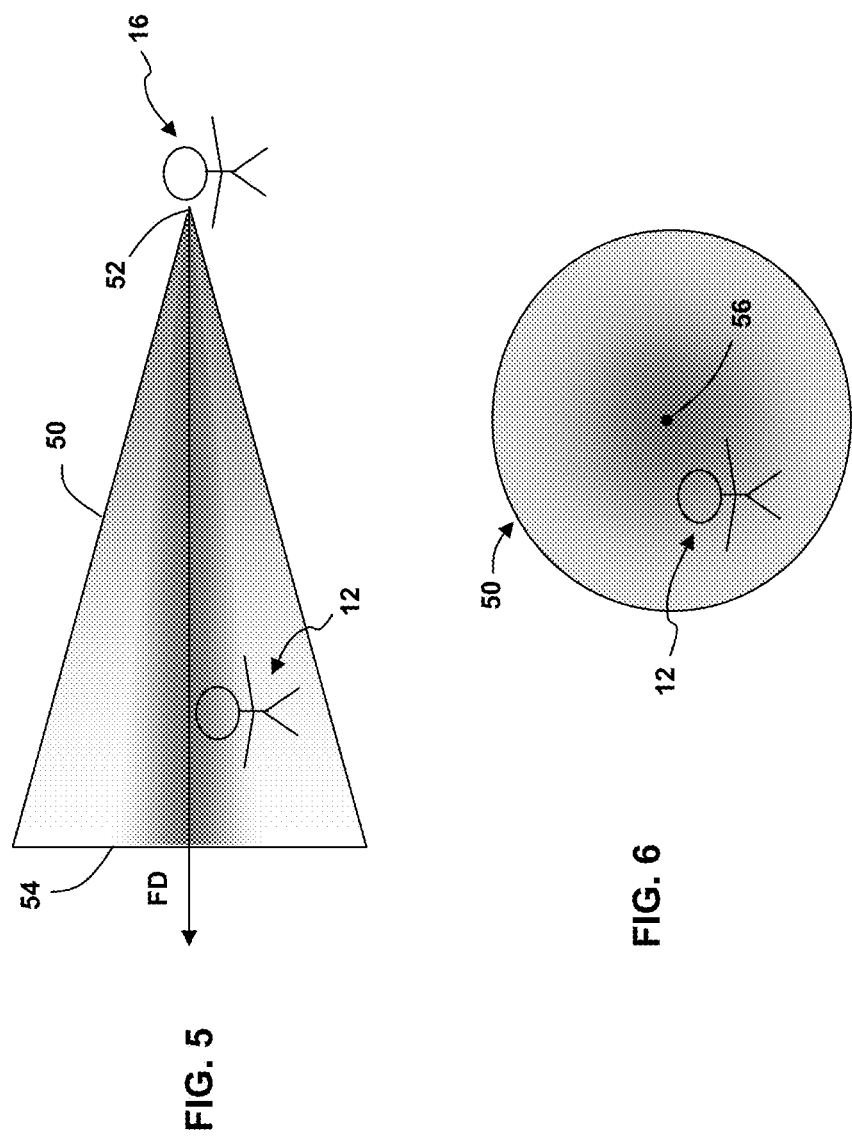

US 9,592,451 B2

DIRECTED COMMUNICATION IN A VIRTUAL ENVIRONMENT

FIELD OF THE INVENTION

The present invention relates to a virtual environment, and more specifically relates to directed communication between avatars in a virtual environment.

BACKGROUND OF THE INVENTION

A virtual environment is an interactive simulated environment accessed by multiple users through an online interface. Users inhabit and interact in the virtual environment via avatars, which are two or three-dimensional graphical representations of humanoids. There are many different types of virtual environments, however there are several features many virtual environments generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual environments (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in it's virtual economy.

Second Life and other on-line virtual environments present a tremendous new outlet for both structured and unstructured virtual collaboration, gaming and exploration, as well as real-life simulations in virtual spaces. These activities, along with yet to be disclosed new dimensions, in turn provide a wide open arena for creative and new communication methods and mechanisms.

Virtual environments have become more complex as processing power, memory storage, and bandwidth have increased, and opportunities for multi-avatar events, such as business meetings, lectures, and social gatherings, have increased. In such cases, where many avatars are in the same location, it is easy for an avatar to be overwhelmed with communication from multiple other avatars. As processors increase in capability, the simulation engines running any given region in a virtual environment will become able to accommodate larger and larger numbers of avatars in a gathering. Further, voice communication is becoming increasingly prevalent in virtual environments. Traditionally, textual communication between avatars is presented in a similar manner, while voice is projected at a constant volume.

SUMMARY OF THE INVENTION

The present invention provides directed communication between avatars in a virtual environment. Communication is improved between avatars in a virtual environment by using context-sensitive volume amplification and text enhancements, resulting in more "lifelike" personal interactions. An avatar in a virtual environment can control the presentation of textual communication and the volume of the avatar's voice and the voices of other avatars. The control can be manual and/or provided automatically based on one or more factors, including the "relative location" of avatars in any/all of the 6 available degrees of freedom (3 translations and 3 rotations) in space.

A first aspect of the present invention is directed to a method for providing directed communication between avatars in a virtual environment, comprising: determining a relative location of a first avatar and a second avatar in a virtual environment; and adjusting an aspect of a communication between the first avatar and the second avatar based on the relative location.

A second aspect of the present invention is directed to a system for providing directed communication between avatars in a virtual environment, comprising: a system for determining a relative location of a first avatar and a second avatar in a virtual environment; and a system for adjusting an aspect of a communication between the first avatar and the second avatar based on the relative location.

A third aspect of the present invention is directed to a program product stored on a computer readable medium, which when executed, provides directed communication between avatars in a virtual environment, the computer readable medium comprising program code for: determining a relative location of a first avatar and a second avatar in a virtual environment; and adjusting an aspect of a communication between the first avatar and the second avatar based on the relative location A fourth aspect of the present invention is directed to a method for deploying an application for providing directed communication between avatars in a virtual environment, comprising: providing a computer infrastructure being operable to: determine a relative location of a first avatar and a second avatar in a virtual environment; and adjust an aspect of a communication between the first avatar and the second avatar based on the relative location.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIG. 4 depicts an example of the variation of the volume of a speaking avatar's voice based on the positional orientation of the speaking avatar relative to a listening avatar.

FIGS. 5 and 6 depict the volume variation of a speaking avatar's voice in relation to the facial direction of a listening avatar, in accordance with an embodiment of the present invention.

FIG. 7 depicts an example of the variation of the volume of a speaking avatar's voice based on the facial direction of a listening avatar.

Figure 1:
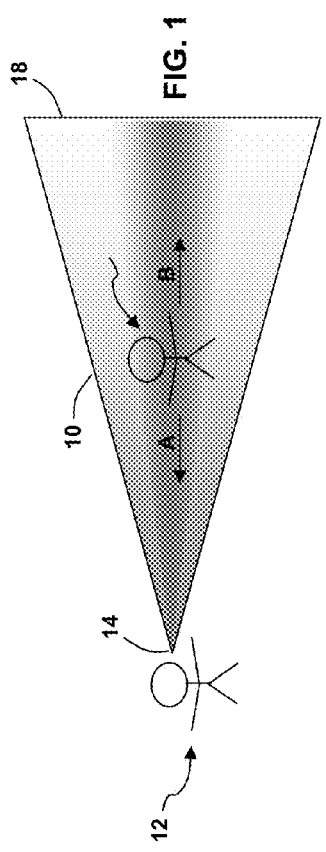
FIGS. 1 and 2 depict the volume variation for speech output by a speaking avatar, as experienced by a listening avatar, in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, The present invention provides directed communication between avatars in a virtual environment. Communication is improved between avatars in a virtual environment by using context-sensitive volume amplification and text enhancements, resulting in more "lifelike" personal interactions. An avatar in a virtual environment can control the presentation of textual communication and the volume of the avatar's voice and the voices of other avatars. The control can be manual and/or provided automatically based on one or more factors.

In accordance with an embodiment of the present invention, the facial direction of a speaking avatar influences the perceived volume of that avatar's voice, by any other avatar. The volume amplification of an avatar's voice may be influenced by a plurality of factors. For instance, one factor is the distance between the avatar who is speaking (speaking avatar) and the location of the avatar who is listening (listening avatar) in relationship to the facial direction of the speaking avatar. An example of this is depicted in FIG. 1, in which a cone 10 is shown extending from a speaking avatar 12, with the top 14 of the cone 10 being located at the mouth of the speaking avatar 12.

Figure 2:
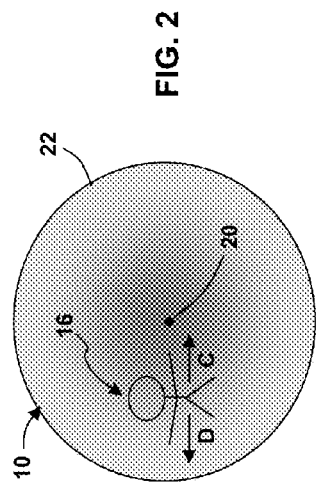

The location of a listening avatar 16 within the cone 10 influences the volume at which the listening avatar 16 experiences the voice of the speaking avatar 12. As the listening avatar 16 moves toward the top 14 of the cone 10 (directional arrow A), the voice of the speaking avatar 12 becomes louder. Conversely, as the listening avatar 16 moves toward the base 18 of the cone 10 (directional arrow B), the voice of the speaking avatar 12 becomes softer. Further, as depicted in FIG. 2, as the listening avatar 16 moves toward the center 20 of the cone 10 (directional arrow C), the voice of the speaking avatar 12 becomes louder. Conversely, as the listening avatar 16 moves toward the edge 22 of the cone 10 (directional arrow D), the voice of the speaking avatar 12 becomes softer. In FIGS. 1 and 2, increased volume of the voice of the speaking avatar 12 is represented by darker shading. Further, the specific size and shape of the cone 20 can be fixed and/or manually and/or automatically adjusted.

Figure 3:
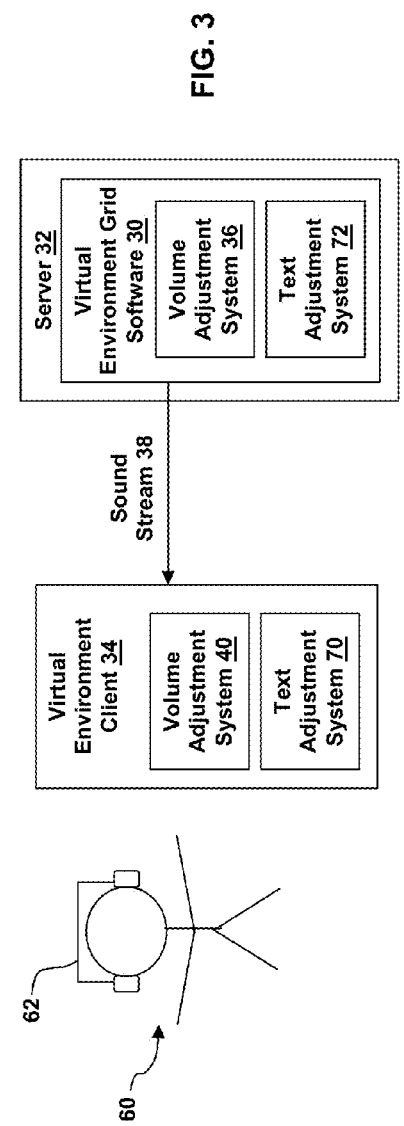
FIG. 3 depicts volume adjustment in accordance with an embodiment of the present invention.

As depicted in FIG. 3, the adjustment of volume based on the relative location, facial direction, etc., of avatars may be conducted, for example, by the software that generates the virtual environment (e.g., virtual environment grid software 30), which typically runs on one or more servers 32, and/or by a virtual environment client 34 (only one of a plurality of possible virtual environment clients 34 is shown for clarity). If the volume adjustment is provided by the virtual environment grid software 30, the volume adjustment calculations are performed by the virtual environment grid software 30 (as represented by volume adjustment system 36) and the sound stream 38 is modified before transmission to the virtual environment client 34. If the volume adjustment is provided by the virtual environment client 34, the calculations are performed in the virtual environment client 34 (as represented by volume adjustment system 40), and the virtual environment client 34 is responsible for increasing or decreasing the rendered volume of the sound stream 38 from the virtual environment grid software 30. Note that as avatar movement (speaking and/or listening avatar) is ongoing, the volume may be dynamically increased or decreased accordingly. Further, the volume adjustment can be provided as a smooth and continuous function of the relative location of avatars to avoid a sudden, discontinuous change (e.g., drop-off or increase) in volume.

In accordance with an embodiment of the present invention, the positional orientation of a speaking avatar relative to a listening avatar can be used to digitally increase or decrease the volume of the speaking avatar's voice, as heard by the listening avatar. For instance, as shown in FIG. 4, the face of a first speaking avatar 12A is directed toward a listening avatar 16A (directional arrow E), while the face of a second speaking avatar 12B is directed elsewhere (directional arrow F), such as toward a group of other listening avatars 16B, 16C, . . . , 16N. In accordance with the present invention, the voice volume $V_{12A}$ of the first speaking avatar 12A who is facing the listening avatar 16A can be increased, while the voice volume $V_{12B}$ of the second speaking avatar 12B who is not facing the listening avatar 16A can be decreased. In this manner, the voice of the first speaking avatar 12A as heard by the listening avatar 16A is louder than the voice of the second speaking avatar 12B as heard by the listening avatar 16A (i.e., $V_{12A} > V_{12B}$). Therefore, noise clutter can be reduced in a crowded area, allowing audio communication to be enhanced. In this manner, a speaking avatar attempting to communicate with a listening avatar will have a greater chance of their communication being heard if they are facing the listening avatar.

FIGS. 5 and 6 depict the volume variation of a speaking avatar's voice in relation to the facial direction of a listening avatar, in accordance with an embodiment of the present invention. In particular, referring first to FIG. 5, the facial direction (FD) of a listening avatar 16 influences the perceived volume of a speaking avatar 12 within view of the listening avatar 16. The volume amplification is influenced by several factors including, for example, the distance between the listening avatar 16 and the speaking avatar 14, and the location of the speaking avatar 12 in relationship to the facial direction of the listening avatar 16.

A cone 50 extends from the center of the face of the listening avatar 16 in the facial direction of the listening avatar 16. The location of speaking avatar 12 within the cone 50 influences the volume at which the listening avatar 16 experiences the voice of the speaking avatar 12. To this extent, the voice of the speaking avatar 12 will be louder the closer the speaking avatar 12 is to the top 52 of the cone 50. Conversely, the voice of the speaking avatar 12 will be softer the closer the speaking avatar 12 is to the base 54 of the cone 50. Further, as depicted in FIG. 6, the voice of the speaking avatar 12 will be louder the closer the speaking avatar 12 is to the center 56 of the cone 50 (i.e., the closer the speaking avatar 12 is to the facial direction of the listening avatar 16), while the voice of the speaking avatar 12 will be softer the farther away the speaking avatar 12 is from the center 56 of the cone 50 (i.e., the farther away the speaking avatar 12 is from the facial direction of the listening avatar 16). In FIGS. 5 and 6, increased volume of the voice of the speaking avatar 12 is represented by darker shading. Further, the specific size and shape of the cone 20 can be fixed and/or manually and/or automatically adjusted.

In accordance with an embodiment of the present invention, the facial direction of a listening avatar relative to a speaking avatar can be used to digitally increase or decrease the volume of the speaking avatar's voice. For instance, as shown in FIG. 7, the face of a listening avatar 16A is directed toward a first speaking avatar 12A (directional arrow G), while a second speaking avatar 12B located elsewhere is speaking, such as toward a group of other listening avatars 16B, 16C, . . . , 16N (directional arrow H). In accordance with the present invention, the voice volume $V_{12A}$ of the first speaking avatar 12A as heard by the listening avatar 16A can be increased, while the voice volume $V_{12B}$ of the second speaking avatar 12B as heard by the listening avatar 16A can be decreased, such that $V_{12A}>V_{12B}$. Therefore, noise clutter can be reduced in a crowded area, allowing audio communication to be enhanced. In this manner, a listening avatar attempting to hear a communication from a speaking avatar will have a greater chance of hearing the communication if they are facing the speaking avatar.

The embodiment of the present invention depicted in FIGS. 1 and 2 can be used alone or in combination with the embodiment of the present invention depicted in FIGS. 5 and 6. In the latter case, the loudest volume occurs within the area of intersection of the cones 10, 50.

In accordance with an embodiment of the present invention, an avatar can manually adjust the volume of a selected avatar's voice within a virtual environment. This can be provided, for example, via the volume adjustment systems 36 and/or 40 (FIG. 3). Such manual settings can be undertaken by an avatar itself, to control the "original" volume of its own voice, or by an avatar seeking to turn up or turn down the volume of one or more selected avatars. An avatar can select an avatar (including itself) and subsequently control the perceived voice volume of the selected avatar through interaction with the virtual environment. This can be achieved, for example, by selecting an avatar (e.g., by clicking on the avatar using a mouse), providing a context menu in response to the selection of the avatar, selecting volume adjustment from the context menu, and then adjusting the volume of the selected avatar's voice with a "slider" control and/or the like. An avatar can also perform this process on another avatar who is not currently speaking, in order to adjust the speaking volume of that avatar if/when it does speak. Further, a group of avatars can be selected and volume adjustment performed for all of the avatars in the group at the same time.

The volume adjustment setting can be saved (e.g., in a preference file and/or the like), so that the avatar will not have to adjust its own volume and/or the volume of a selected avatar's voice more than once. In another embodiment, the voice volume of the selected avatar can be manually set relative to other ambient chatter, and not an absolute volume. Any suitable now known or later developed technique for selecting an avatar and adjusting the voice volume of the selected avatar can be used in the practice of the present invention.

Figure 8:
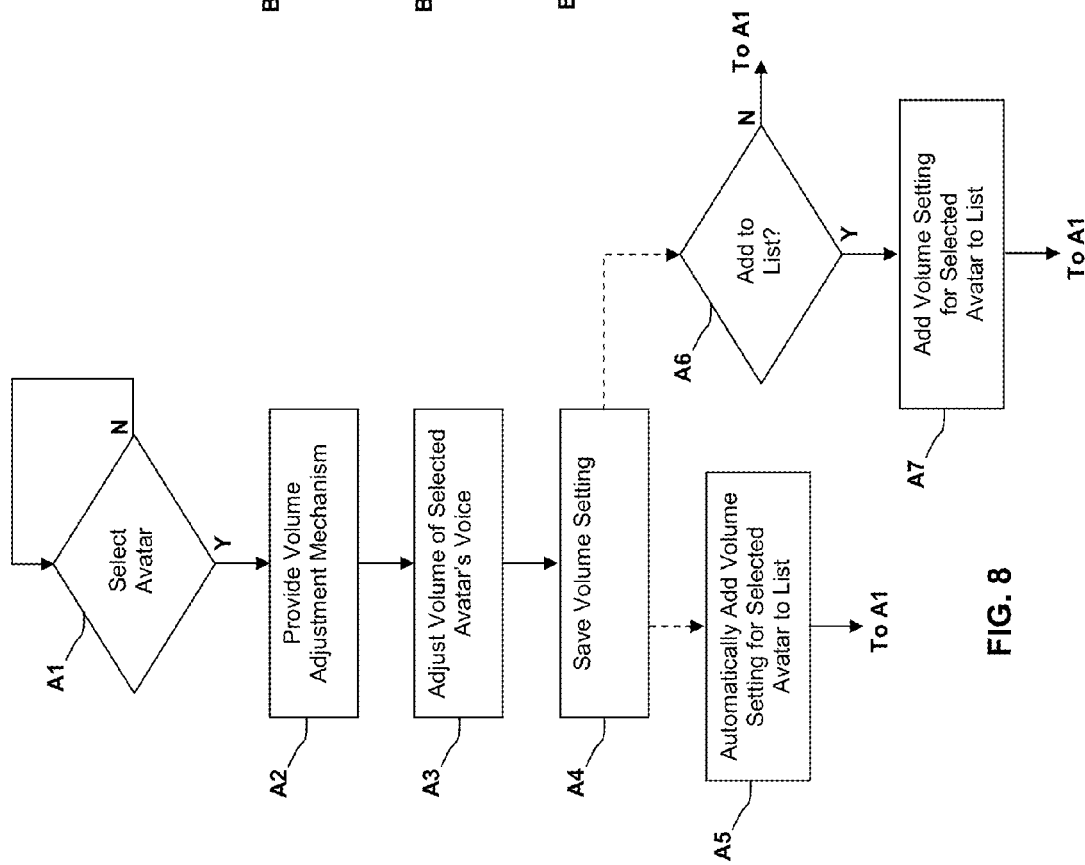

An illustrative process diagram of this type of volume adjustment is provided in FIG. 8. In A1, an avatar selects an avatar (e.g., another avatar or itself). In A2, a volume adjustment mechanism is provided. In A3, the avatar adjusts the volume of the selected avatar's voice using the volume adjustment mechanism. The volume setting for the selected avatar is saved in A4.

An avatar can maintain a list of avatars whose voices are to be portrayed louder than a set volume baseline, allowing friends or members of a common group to have volume advantages over other avatars. The list of avatars can be set manually by an avatar and/or generated automatically. As an example of the automatic generation of the list, interactions between avatars can be tracked to automatically generate the list of avatars based, for example, on the number of interactions between avatars. This can be extended in the social networking context to enable increased volume for avatars who are on the list with whom an avatar has interacted previously. Again, this functionality can be provided, for example, via the volume adjustment systems 36 and/or 40 (FIG. 3). Referring again to the illustrative process diagram of FIG. 8, the avatar selected in A1 can be added to the list automatically (A5) or manually (A6, A7).

An avatar can opt to block or mute the voice of another avatar, regardless of the voice volume settings set by the other avatar. This can be useful, for example, in the case of "spamming" avatars or other virtual environment nuisances. In accordance with an embodiment, an avatar can select another avatar and mute/block that avatar through an interaction with the virtual environment. This can be achieved, for example, by selecting an avatar (e.g., by clicking on the avatar using a mouse), providing the avatar with a context menu, and selecting a block/mute command from the context menu. Such a block/mute command can be set so that it is in effect for only a current login session, for a predetermined period of time, or until switched off. Further, such a block/mute command can be extended broadly to members of a common group. This may be desirable, for example, where unsolicited advertising avatars feature different names, but all share a common group.

Figure 9:
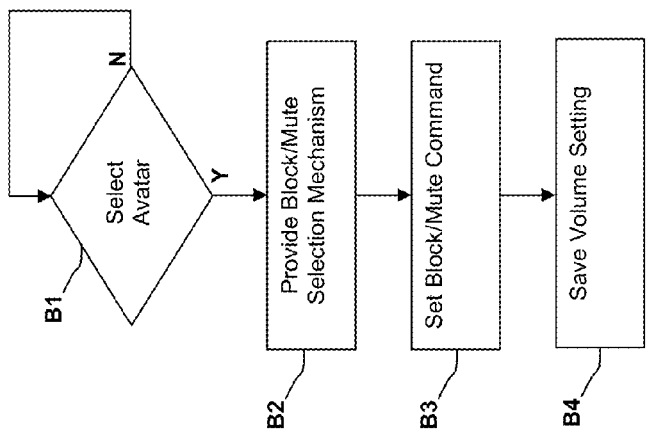
FIGS. 8 and 9 depict illustrative processes in accordance with embodiments of the present invention.

An illustrative diagram of this process is provided in FIG. 9. In B1, an avatar selects another avatar. In B2, a block/mute selection mechanism is provided. In B3, the avatar sets a block/mute command for the selected avatar. The block/mute setting for the selected avatar is saved in B4.

An end-user (60, FIG. 3) controlling an avatar in a virtual environment that includes voice communication may opt to purchase a corded or cordless headset 62 to ease communication. Such a headset may be able to track head movements of the wearer. In such a scenario, the end-user's head movements can be translated to their avatar in the virtual environment and can influence the volume of speech communication as detailed above.

Although described above with regard to volume, it should be noted that present invention can also be used to adjust other audio characteristics of speech communication between avatars in lieu of, or in addition to, volume. Such audio characteristics can include, for instance, pitch, gender, accent, voice rate, and/or the like. Again, the adjustment can be provided as a smooth and continuous function of the relative location of avatars.

It should be noted that any of the above-described embodiments, or variants thereof, can be used independently or in any combination. Further, although the invention has been described in terms of voice communication, any of the above-described embodiments, or variants thereof, can be applied to textual communication instead of, or in addition to, voice communication. For instance, the font size and/or formatting of a text message and/or other textual communication can be adjusted, as described above. Such text formatting can comprise, for example, the font, color, brightness, shape, blink rate, etc., of text messages and/or other textual communication. To this extent, instead of increasing/decreasing volume based on the relative location, facial direction, etc., of avatars, the present invention can be used to adjust the text in text messages between avatars. To provide this functionality, as depicted in FIG. 3, at least one of the virtual environment client 34 and virtual environment grid software 30 can include a respective text adjustment system 70, 72. The adjustment can be controlled such that the font size and/or formatting changes are provided as a smooth and continuous function of the relative location of avatars.

Figure 10:
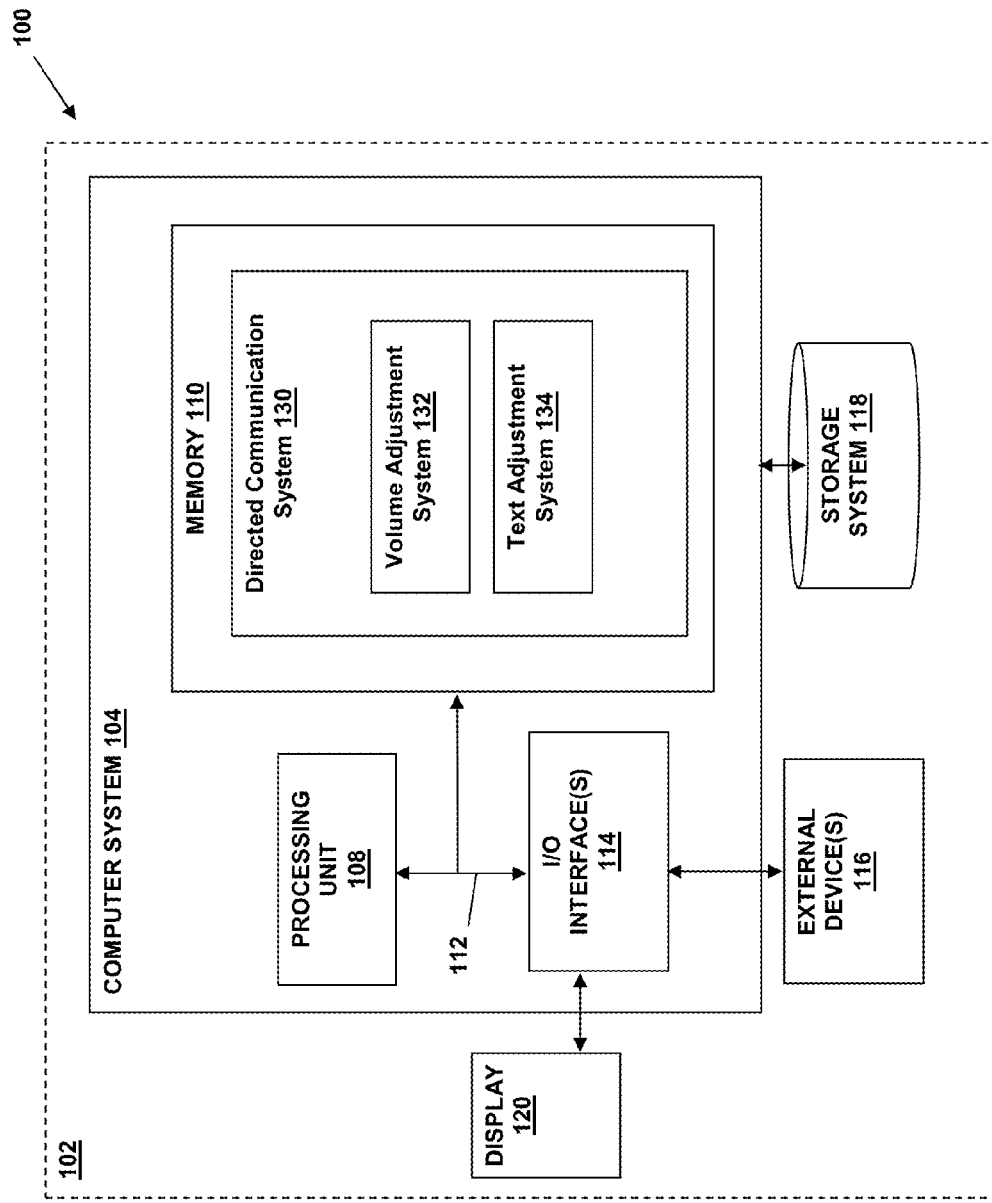
FIG. 10 depicts an illustrative computer system for implementing embodiment(s) of the present invention.

FIG. 10 depicts an illustrative system 100 for providing directed communication between avatars in a virtual environment, in accordance with any/all embodiments of the present invention. The system 100 includes a computer infrastructure 102 that can perform the various processes described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as directed communication system 130, that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user to interact with the computer system 104 or any device that enables the computer system 104 to communicate with one or more other computer systems.

The directed communication system 130 is configured to provide directed communication between avatars in a virtual environment, as detailed above, in accordance with any/all embodiments of the present invention. For example, the directed communication system 130 can comprise a volume adjustment system 132 and/or a text adjustment system 134 for providing directed communication between avatars in a virtual environment, based on the relative location, facial direction, etc., of the avatars.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in an embodiment, the computer infrastructure 102 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 10 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a computer infrastructure, such as the computer infrastructure 102, that performs the processes of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for providing directed communication between avatars in a virtual environment that are controlled by end-users from outside the virtual environment, comprising:
   determining a relative location of a first avatar and a second avatar in a virtual environment, wherein at least one end-user of the first avatar and the second avatar wears a headset configured to track head movements thereof, wherein the head movements of the end-user translate to their avatar and influence volume of voice communication from their avatar;
   adjusting aspects of a voice communication between the first avatar and the second avatar based on the relative location and the track head movements of the at least one end-user;
   referring to a list of avatars whose audio characteristics are to be portrayed differently in a voice communication, the list containing types of audio characteristics to be portrayed for each avatar on the list, wherein the list and the types of audio characteristics to be portrayed for each avatar on the list are detected and generated automatically from audio characteristics that the avatars have used in past interactions within the virtual environment; and
   further adjusting the audio characteristics of one of the first avatar and the second avatar in accordance with the types of audio characteristics set forth in the automatically generated list of avatars whose detected audio characteristics are to be portrayed differently in a voice communication in response to determining that one of the first avatar and the second avatar is in the automatically generated list of avatars whose detected audio characteristics are to be portrayed differently in a voice communication.

2. The method of claim 1, wherein the aspects of the voice communication that are adjusted include volume and at least one of pitch, gender, voice rate and accent.

3. The method of claim 1, wherein the adjusting of aspects of the voice communication between the first avatar and the second avatar are based on a facial direction of the first avatar relative to the second avatar.

4. The method of claim 1, wherein determining a relative location further comprises:
   determining a distance between the first avatar and the second avatar; and
   adjusting the audio characteristics of the voice communication based on the distance.

5. The method of claim 1, wherein determining a relative location further comprises:
   determining a positional orientation of the first avatar relative to the second avatar; and
   adjusting the audio characteristics of the voice communication based on the positional orientation direction.

6. The method of claim 1, wherein determining a relative location further comprises:
   determining a facial direction of the second avatar relative to the first avatar; and
   adjusting the audio characteristics of the voice communication based on the facial direction of the second avatar relative to the first avatar.

7. The method of claim 1, wherein determining a relative location further comprises:
   determining a positional orientation of the second avatar relative to the first avatar; and
   adjusting the audio characteristics of the voice communication based on the positional orientation direction.

8. The method of claim 1, wherein the voice communication further comprises a textual communication, and wherein an aspect of the textual communication between the first avatar and the second avatar is adjusted based on the relative location of the avatars to each other, wherein the aspect of the textual communication comprises at least one of a text size and formatting of the textual communication.

9. The method of claim 8, wherein the formatting of the textual communication is selected from the group consisting of font, color, brightness, shape, and blink rate.

10. The method of claim 9, wherein the aspects of the voice communication and the textual communication between the first avatar and the second avatar are adjusted as a smooth and continuous function of the relative location.

11. A computer system, comprising:
   at least one processing unit;
   memory operably associated with the at least one processing unit;
   a system for providing directed communication between avatars in a virtual environment that are controlled by end-users from outside the virtual environment that is storable in memory and executable by the at least one processing unit, the system comprising:
      a system for determining a relative location of a first avatar and a second avatar in a virtual environment, wherein at least one end-user of the first avatar and the second avatar wears a headset configured to track head movements thereof, wherein the head movements of the end-user translate to their avatar and influence volume of voice communication from their avatar;
      a system for adjusting aspects of a voice communication between the first avatar and the second avatar based on the relative location and the track head movements;
      a system for referring to a list of avatars whose audio characteristics are to be portrayed differently in a voice communication, the list containing types of audio characteristics to be portrayed for each avatar on the list, wherein the list and the types of audio characteristics to be portrayed for each avatar on the list are detected and generated automatically from audio characteristics that the avatars have used in past interactions within the virtual environment; and
      a system for further adjusting the audio characteristics of one of the first avatar and the second avatar in accordance with the types of audio characteristics set forth in the automatically generated list of avatars whose detected audio characteristics are to be portrayed differently in a voice communication in response to determining that one of the first avatar and the second avatar is in the automatically generated list of avatars whose detected audio characteristics are to be portrayed differently in a voice communication.

12. The computer system of claim 11, wherein the aspects of the voice communication that are adjusted include volume and at least one of pitch, gender, voice rate and accent.

13. The computer system of claim 11, wherein the adjusting of aspects of the voice communication between the first avatar and the second avatar are based on a facial direction of the first avatar relative to the second avatar.

14. The computer system of claim 11, wherein the system for determining a relative location further comprises:

a system for determining a distance between the first avatar and the second avatar; and a system for adjusting the audio characteristics of the voice communication based on the distance.

15. The computer system of claim 11, wherein the system for determining a relative location further comprises:

a system for determining a positional orientation of the first avatar relative to the second avatar; and a system for adjusting the audio characteristics of the voice communication based on the positional orientation direction.

16. The computer system of claim 11, wherein the system for determining a relative location further comprises:

a system for determining a facial direction of the second avatar relative to the first avatar; and a system for adjusting the audio characteristics of the voice communication based on the facial direction of the second avatar relative to the first avatar.

17. The computer system of claim 11, wherein the system for determining a relative location further comprises:

a system for determining a positional orientation of the second avatar relative to the first avatar; and a system for adjusting the audio characteristics of the voice communication based on the positional orientation direction.

18. A program product stored on a non-transitory computer readable storage device, which when executed by a computer system, provides directed communication between avatars in a virtual environment that are controlled by end-users from outside the virtual environment, the computer readable storage device comprising program code for:

determining a relative location of a first avatar and a second avatar in a virtual environment, wherein at least one end-user of the first avatar and the second avatar wears a headset configured to track head movements thereof, wherein the head movements of the end-user translate to their avatar and influence volume of voice communication from their avatar;

adjusting aspects of a voice communication between the first avatar and the second avatar based on the relative location and the track head movements of the at least one end-user;

referring to a list of avatars whose audio characteristics are to be portrayed differently in a voice communication, the list containing types of audio characteristics to be portrayed for each avatar on the list, wherein the list and the types of audio characteristics to be portrayed for each avatar on the list are detected and generated automatically from audio characteristics that the avatars have used in past interactions within the virtual environment; and further adjusting the audio characteristics of one of the first avatar and the second avatar in accordance with the types of audio characteristics set forth in the automatically generated list of avatars whose detected audio characteristics are to be portrayed differently in a voice communication in response to determining that one of the first avatar and the second avatar is in the automatically generated list of avatars whose detected audio characteristics are to be portrayed differently in a voice communication.

19. The program product of claim 18, wherein the aspects of the voice communication that are adjusted include volume and at least one of pitch, gender, voice rate and accent.

20. A method for deploying an application for providing directed communication between avatars in a virtual environment that are controlled by end-users from outside the virtual environment, comprising:

providing a computer infrastructure being operable to:

determine a relative location of a first avatar and a second avatar in a virtual environment, wherein at least one end-user of the first avatar and the second avatar wears a headset configured to track head movements thereof, wherein the head movements of the end-user translate to their avatar and influence volume of voice communication from their avatar;

adjust aspects of a voice communication between the first avatar and the second avatar based on the relative location and the track head movements of the at least one end-user;

refer to a list of avatars whose audio characteristics are to be portrayed differently in a voice communication, the list containing types of audio characteristics to be portrayed for each avatar on the list, wherein the list and the types of audio characteristics to be portrayed for each avatar on the list are detected and generated automatically from audio characteristics that the avatars have used in past interactions within the virtual environment; and further adjust the audio characteristics of one of the first avatar and the second avatar in accordance with the types of audio characteristics set forth in the automatically generated list of avatars whose detected audio characteristics are to be portrayed differently in a voice communication in response to determining that one of the first avatar and the second avatar is in the automatically generated list of avatars whose detected audio characteristics are to be portrayed differently in a voice communication.

* * * * *